US008124183B2

(12) United States Patent
Knight et al.

(10) Patent No.: US 8,124,183 B2
(45) Date of Patent: Feb. 28, 2012

(54) FAST DRYING EMULSION SYSTEMS

(75) Inventors: William R. Knight, Ravenna, OH (US); Ge Wang, Solon, OH (US); Dominic R. Cremona, Parma, OH (US); Ronald M. Velichka, Willowick, OH (US)

(73) Assignee: Tremco Incorporated, Beachwood, OH (US)

( * ) Notice: Subject to any disclaimer, the term of this patent is extended or adjusted under 35 U.S.C. 154(b) by 1110 days.

(21) Appl. No.: 11/502,711

(22) Filed: Aug. 11, 2006

(65) Prior Publication Data
US 2008/0038474 A1 Feb. 14, 2008

(51) Int. Cl.
*B05D 1/36* (2006.01)
(52) U.S. Cl. .................. 427/301; 427/136; 427/138
(58) Field of Classification Search .......... 427/301, 427/136, 138
See application file for complete search history.

(56) References Cited

U.S. PATENT DOCUMENTS 3,785,852 A   1/1974   Schleidt
(Continued)

FOREIGN PATENT DOCUMENTS

DE   3302440   10/1983
(Continued)

OTHER PUBLICATIONS

Sjoblom, Johann (Ed.), "Emulsions and Emulsion Stability, 2nd Ed.," p. 400, 2006, Taylor & Francis Group, Boca Raton, FL.
(Continued)

*Primary Examiner* — Timothy Meeks
*Assistant Examiner* — Nathan T Leong
(74) *Attorney, Agent, or Firm* — Calfee, Halter & Griswold, LLP

(57) ABSTRACT

The drying time for aqueous asphalt emulsions used in the roofing and other waterproofing industries is shortened by separately applying an emulsion breaking agent to the substrate to be waterproofed, to the aqueous asphalt emulsion after it is applied, or both.

9 Claims, No Drawings

U.S. PATENT DOCUMENTS

| | | | |
|---|---|---|---|
| 6,894,092 B2 * | 5/2005 | Sylvester | 524/59 |
| 2001/0051252 A1 | 12/2001 | Voyer et al. | |
| 2004/0009319 A1 * | 1/2004 | Zanchetta et al. | 428/40.1 |
| 2004/0244316 A1 | 12/2004 | Macuga et al. | |
| 2005/0074580 A1 | 4/2005 | Gross et al. | |
| 2005/0098504 A1 | 5/2005 | Manz et al. | |

FOREIGN PATENT DOCUMENTS

| | | | |
|---|---|---|---|
| GB | 1 443 173 | | 7/1976 |
| JP | 03130275 | | 6/1991 |
| JP | 07010653 | | 1/1995 |
| JP | 11-107298 | * | 4/1999 |
| JP | 11107298 | | 4/1999 |
| WO | 01/88040 | | 11/2001 |

OTHER PUBLICATIONS

Lavin, Patrick G., "Asphalt Pavements, A practical guide to design, production, and maintenance for engineers and architects," 2003, Spon Press, London, UK, New York, NY.

Baker, M.C., "CBD-95. Roofing Membrane Design," Canadian Building Digest, Nov. 1967, NRC-CNRC, Canada.

Schramm, Laurier L., "Surfactants: Fundamentals and Applications in the Petroleum Industry," 2000, pp. 3-5, Cambridge Univ. Press, Cambridge, UK.

Newaz, S.S. et al., "Polychloroprene-Modified Aqueous Asphalt Emulsion: Use in Roofs and Roads," Asphalt Science and Technology, 1997, pp. 297-306, Marcel Dekker, Inc.

Kuennen, Tom (Contr. Ed.), "Polymers Add Performance to Asphalt Emulsions," Nov. 2004, Better Roads for the Government/Contractor Project Team, James Informational Media, Inc.

James, A.D. et al., "The Direct Measurement of the Adsorption of Cationic Surfactants onto the Surface of Slurry Seal Aggregates," 1990, 28th Annual Convention of ISSA, Tampa, FL.

PCT/US07/17813, International Search Report, Jan. 29, 2008.

Extended European Search Report dated Jan. 21, 2011 from European Application No. 10172785.

European Search Report dated May 18, 2010 for EP 07 83 6719.

* cited by examiner

FAST DRYING EMULSION SYSTEMS

BACKGROUND AND SUMMARY

Asphalt emulsions are widely used in roofing and other waterproofing applications. Unfortunately, most asphalt emulsions dry slowly, some requiring as long as a few weeks to dry before other coatings can be applied. This is inconvenient to both roofing contractor and building owner, since roofing projects cannot be finished quickly. Slow drying times also limit the times when such emulsions can be applied, since freshly-applied asphalt emulsion layers can be damaged or ruined by unexpected rain.

It is already known to speed drying times of asphalt emulsions by co-spraying an emulsion-breaking agent, such as calcium chloride, with the asphalt emulsion using a two component sprayer. See, for example, Usmani, *Asphalt Science and Technology*,© 1997, Marcel Dekker, Inc., pp 297-306. This causes the emulsion to be broken, which in turn liberates its aqueous phase for rapid evaporation. This approach, which is often seen in the mining industry, is not commonly used in the roofing industry where the most popular spray equipment is capable of handling only a single component. Two-component sprayers are expensive and difficult to operate and hence beyond the purview of most roofing contractors.

It is also known to mix the emulsion-breaker with the asphalt emulsion before it is applied. See, p. 301 of the Usmani publication. This impacts the emulsion's working time and therefore is undesirable in commercial operations.

In accordance with this disclosure, this slow-drying problem is obviated by applying an emulsion-breaking agent to the surface to be waterproofed before the asphalt emulsion is applied, or by applying an emulsion-breaking agent to the asphalt emulsion after the emulsion is applied to the surface to be waterproofed, or both. By following this approach, the freshly-applied asphalt emulsion is broken and its aqueous phase liberated for evaporation as soon as the emulsion is applied, or promptly thereafter. However, because the emulsion breaker is applied separately from the emulsion, a two component sprayer is unnecessary. Therefore, this method can be easily practiced by the vast majority of roofing contractors using conventional spray equipment.

Thus, this disclosure provides a process for applying a waterproofing asphalt layer to a substrate comprising applying an asphalt emulsion to the substrate and contacting the asphalt emulsion with an emulsion breaker to liberate the aqueous phase of the emulsion and thereby speed emulsion drying, the emulsion breaker being applied to the substrate before the emulsion is applied to the substrate, or to the emulsion after the emulsion is applied to the substrate, or both.

In addition, this disclosure also provides a new building product for use in forming a waterproofing asphalt layer, the new building product comprising a fibrous or foraminous web or layer of material impregnated with an emulsion breaker.

DETAILED DESCRIPTION

The Substrate

This disclosure is directed to applying waterproofing asphalt layers to substrates of any type or structure, in particular to any structure where asphalt protective layers have already been used in the past or may be used in the future. For example, the technology described here can be used for waterproofing concrete and/or cinderblock building foundations, both above ground and underground, both inside and outside, and both new and used construction, for example. In addition, it can also be used for waterproofing a wide variety of other objects, e.g. structural members and/or sheets or webs, both self-supporting and flexible, made from a wide variety of different materials including steel, aluminum and other metals, plastics, wood products and the like. Most commonly, however, the technology described here will be used for forming waterproof asphalt roofing systems.

Roofing systems can be formed in many different ways from a variety of different materials. A typical asphalt roofing system generally includes a foundation layer, such as a plywood or particle board base, for providing structural integrity. Most roofing systems also include an insulating layer on the foundation layer, which may be made from any material providing a desired level of insulation. Examples include polymer foams, especially those made from polyurethanes, polystyrene, polyisocyanate, polyester and the like, wood fiber, other cellulosic materials, and so forth. Many asphalt roofing systems also include one or more additional "base sheets" on top of the insulation layer (or foundation where the insulation layer is omitted), these base sheets taking the form of a felt, fiberglass or polymer fiber mat or layer which has been previously impregnated with asphalt, normally molten, such that the base sheet, as a whole, is continuous and hence waterproof.

Additionally or alternatively, such a base or reinforcing sheet can be impregnated with asphalt by embedding such mat or layer in a previously-applied layer of asphalt emulsion and then allowing the emulsion to dry. Multiple such base or reinforcing layers can also be used.

A layer of asphalt is then applied to this base or reinforcing sheet, or to the "final" or "outermost" base or reinforcing sheet when more than one is used. For this purpose, the asphalt can be applied in molten, solution or emulsion form. Molten asphalt is difficult and unpleasant to work with, while the organic solvents needed to dissolve asphalt can have undesirable odors. Therefore, aqueous asphalt emulsions represent a preferred method of application in most instances. In any event, the asphalt is applied in such a way that a continuous, coherent, solidified, waterproofing asphalt layer is formed. If desired, a layer of aggregate such as gravel or crushed stone can be applied to this waterproofing asphalt layer to enhance its abrasion resistance.

As indicated above, this disclosure is directed to forming waterproofing asphalt layers on substrates or any shape or structure and made from any material. It will therefore be appreciated that by "substrate" is meant the article to which an aqueous asphalt emulsion is applied so at to form a waterproof asphalt coating or protective layer once the aqueous phase of the emulsion has evaporated, regardless of the shape or composition of this article. Moreover, where more than one waterproofing protective asphalt layer is applied using the technology of this disclosure, "substrate" refers to the article to which the first of these waterproofing protective asphalt layer is applied.

Aqueous Asphalt Emulsions

Aqueous asphalt emulsions are well known materials of commerce that have been used for many years in providing waterproofing protective layers. They are most commonly used in the paving industry in connections with providing roads, streets, highways, etc. In addition, they are also commonly used in the building industries for providing asphalt roofing systems as well as for waterproofing foundations, especially those made from poured concrete and cinderblock. When used in paving applications, they normally contain aggregate materials such as crushed stone, gravel, etc. When used in building applications, they normally contain little if any aggregate or other filler.

The compositions and properties of aqueous asphalt emulsions are well known. In general, they are composed of three ingredients, asphalt, water and an emulsifier. Asphalt, which is sometimes known as "asphalt cement," is a colloid composed of several fractions, the major ones being asphaltenes and maltenes. [See http://www.blacklidgeemulsions.com/spec-3.htm] The asphaltenes, which are the dispersed phase, are thought to furnish hardness while the maltenes, which are the continuous phase, are believed to provide the adhesive and ductile properties of the material and to influence its viscosity and flow properties.

Most aqueous asphalt emulsions are made with asphalts in the 50-250 penetration range, although climatic conditions may dictate that a harder or softer asphalt be used. Moreover, most aqueous asphalt emulsions contain about 40-70 wt. % asphalts, although greater or lesser amounts can be used if desired. For roofing and other building applications, emulsions containing about 40-60 wt. % asphalts in the 50-125 penetration range are more typical, while emulsions containing about 55-70 wt. % asphalts in the 100-250 penetration range are more typical for paving applications.

The second largest ingredient of asphalt emulsions is water. Since the positive and negative ions found in naturally occurring water can affect emulsion stability, water containing impurities should be avoided when making these products.

The third ingredient found in aqueous asphalt emulsions is the emulsifier or surface-active agent, commonly called a surfactant. The emulsifier keeps the asphalt droplets in stable suspension and controls the breaking time. The surfactant changes the surface tension at the interface, i.e., the area of contact between the asphalt droplets and the water.

Two different types of emulsifier are normally used, anionic surfactants and cationic surfactants. The most common anionic emulsifiers are fatty acids, which are wood-product derivates such as tall oil, rosin, and lignins. Anionic emulsifiers are saponified (turned into soap) by reacting with sodium hydroxide or potassium hydroxide. Most cationic emulsifiers are fatty amines (diamines, imidazolines, amidoamines, for example). The amines are converted into soap by reacting with acid, usually hydrochloric. Another type of emulsifying agent, fatty quarternary ammonium salts, is used to produce cationic emulsions. They are water-soluble salts as produced and do not require the addition of acid to make them water-soluble. They are stable, effective cationic (positively charged) emulsifiers.

Fillers and Other Optional Ingredients

In addition to the three basic components discussed above, aqueous asphalt emulsions can also include a variety of different fillers and other optional ingredients.

The most common example is the aggregates found in paving applications, such as crushed stone, gravel and so forth. Additional examples include accelerators, polymers, latexes and rubber modifiers. Particular examples of elastomeric polymers commonly included in aqueous asphalt emulsions include copolymers of styrene and butadiene, styrene butadiene rubber latexes, polychloroprene latex, polyisoprene, and crumb rubber modifier. Particular examples of elastomeric polymers commonly included in aqueous asphalt emulsions include ethylene vinyl acetate, polyethylene, polychloroprene latex and various compounds based on polypropylene.

All of these fillers and optional ingredients can be included in the aqueous asphalt emulsions used in the technology of this disclosure for their known properties and effects.

Emulsion Breaker-Identity

In accordance with this disclosure, the aqueous asphalt emulsion is contacted with an emulsion breaker to break the emulsion, thereby liberating or releasing the emulsion's water content for easy and rapid evaporation. In this context, an "emulsion breaker" or "emulsion-breaking agent" is any chemical which will render the asphalt emulsion unstable in the sense that a quantity of the emulsion in a beaker will separate into distinct aqueous and organic phases within one hour of being contacted with a sufficient amount of the chemical.

Chemicals which function as emulsion breakers are well known. See the Usmani publication cited above, for example. As appreciated by emulsion chemists, emulsion breakers are specific to the emulsifier used in the system. That is to say, the particular chemicals that will break a particular aqueous asphalt emulsion depend primarily on the particular emulsifier from which the emulsion is made, since breaking an emulsion essentially amounts to counteracting the stabilizing effect provided by that emulsifier. Therefore, the particular chemical selected for breaking a particular emulsion must be capable of counteracting the stabilizing activity of the particular emulsifier employed.

Examples of chemicals which will break aqueous asphalt emulsions formed with anionic surfactants include calcium chloride, calcium nitrate, aluminum chloride and ferric chloride. Examples of chemicals which will break aqueous asphalt emulsions formed with cationic surfactants include any alkaline or acidic material which will change or shock the pH of the latex to an unstable value.

Emulsion Breaker-Application

The emulsion breaker can be contacted with the aqueous asphalt emulsion in accordance with this disclosure by any means which does not involve simultaneous application of both the emulsion breaker and the aqueous asphalt emulsion to the substrate. Normally, this will be done either by applying the emulsion breaker to the substrate before the aqueous asphalt emulsion is applied, or by applying the emulsion breaker directly to the aqueous asphalt emulsion after the emulsion is applied to the substrate and before it is dried. Both techniques can also be used together.

Thus for example, the emulsion breaker dissolved or dispersed in a suitable solvent such as water or other organic liquid can be sprayed on the substrate before the aqueous asphalt emulsion is applied. Alternatively, the aqueous asphalt emulsion can be applied to the substrate first and the emulsion breaker dissolved or dispersed in a suitable solvent then applied to the previously-applied asphalt emulsion before it is dried.

Impregnated Reinforcing Sheet

In still another approach, the emulsion breaker can be provided by applying to the substrate a new building product comprising a fibrous or foraminous, preferably flexible, web or layer of material impregnated with the emulsion-breaking agent. For example, the emulsion breaker in liquid form can be impregnated into such a web or layer in a factory and then allowed to dry to produce a building product that can be stored, shipped and then applied to the substrate long after it is made. Alternatively, such a building product can be made on the job site by spraying the web or layer with the emulsion breaker in liquid form, and then applying the building product so made to the substrate. Or, the fibrous or foraminous web or layer can be applied to the substrate first and then impregnated with the emulsion breaker second. In any event, when the aqueous asphalt emulsion is then applied to such a building product, it will immediately break into its aqueous and organic phases as a result of contact with the emulsion breaker impregnated into this product.

In still another approach, the new building product described above can be contacted with the aqueous asphalt emulsion after the emulsion is applied to the substrate, before the emulsion is dried. Once again, contact of the asphalt emulsion with the emulsion breaker in this building product will cause the emulsion to break into its aqueous and organic phases, thereby liberating this aqueous phase for easy and rapid drying.

The emulsion breaker-impregnated reinforcing sheet described above can be made from any fibrous or foraminous web or layer material which will receive the aqueous asphalt emulsion among its interstices and which will also receive and hold on the surfaces of these interstices a suitable amount of the emulsion breaker. Examples includes webs and layers made from essentially any naturally-occurring or synthetic material, and specifically include those materials normally used in making the base or reinforcing sheets mentioned above in connection with forming conventional asphalt roofing systems. Particular examples include fiberglass and polyester.

Finishing Layers

In still another approach, the technology of this disclosure can be used to special advantage in producing roofing systems having finishing layers based on reflective acrylic emulsions. Reflective white roofing systems based on acrylic emulsions, optionally filled with heat and/or light reflective fillers, are becoming increasingly popular in warmer climates. When such finishing layers are applied a top conventional asphalt roofing systems, it necessary to wait two weeks or longer for the asphalt roofing system to set and dry before applying the reflective acrylic emulsion. Moreover, it is also necessary to limit the amount of acrylic emulsion applied to 2 gal./sq. (a "square" is 100 square feet) and to wait 24 hours before applying a second layer of the acrylic emulsion. If desired, the delay between the first and second acrylic emulsion layers can be shortened by including a cement curative in the acrylic emulsion.

In accordance with the technology of this disclosure, however, it has been found that the such acrylic emulsion finishing layers can be applied with little or no delay after application of the asphalt roofing system of this disclosure is complete. For example, such decorative acrylic emulsions can be applied within 24 hours, and even on the same day as, the last asphalt layer of this asphalt roofing system is applied. Moreover, acrylic emulsion layers ≧4 gal./sq., ≧6 gal./sq. and even ≧8 gal./sq can be applied in a single application, since the emulsion-breaker in this asphalt roofing system also initiates cure of this material. This greatly reduces costs, not only because long delays are avoided, but also because labor requirements are substantially reduced.

Uses

As indicated above, the technology of this disclosure can be used in any application where aqueous asphalt emulsions have previously been used, or will be used. Nonetheless, this technology finds particular applicability where fast drying of an aqueous asphalt emulsion is an advantage.

Moreover, this technology also enables aqueous asphalt emulsions to be used in new applications such as in providing quick set insulation adhesive for instant green strength, as the binder component in cast-in-place roof applications, and for repair and patch applications to give instant water proofing performance.

EXAMPLES

In order to more thoroughly describe this technology, the following working examples are provided:

Comparative Example A

An SBR-modified (Styrene Butadiene Rubber-modified) asphalt emulsion containing 62.48 weight solids and having a of pH 10.32 and a density of 8.25 lb/gal was prepared by combining the ingredients listed in Table 1:

TABLE 1

Composition of SBR-Modified Asphalt Emulsion

| Ingredient | Generic Composition | Commercial Name | Weight % |
| --- | --- | --- | --- |
| Asphalt | Asphalt | AC-17 | 50 |
| Tap Water | N/A | N/A | 27 |
| Emulsifier | Soap | Vinsol/Caustic Soda | .6 |
| Latex | SBR | Intex 132 | 16.5 |
| Mineral Spirits | Aliphatic Hydrocarbon | Exxol D40 | 4.1 |
| Aqua Ammonia | Ammonium Hydroxide | Aqua Ammonia | .3 |
| Thickener | Polyacrylic Acid | Acrysol ASE-95 | 1.5 |

A three-ply built-up roofing system was prepared on a sunny, 62° F., 40% humidity day by applying a layer of the above asphalt emulsion onto the roof foundation at a rate of 4 gal/sq. to provide a coating 64 wet mils thick (A "wet mil"=1/1000 inch of uncured coating) using a hydraulic pump at 2000 psi with a 0.099 spray tip and a 32-inch fan pattern. A reinforcing layer composed of a stitch-bonded polyester fiber mat scrim was then applied in shingle fashion, promptly rolled into the emulsion and then broomed to eliminate wrinkles and ensure positive embedment. Two additional scrim/asphalt plies were then applied in the same way.

After two weeks, the asphalt emulsion had completely set up and a first white acrylic coating was applied at rate of 2 gal/sq. When this first white acrylic coating had finally dried, which took approximately 24 hours, a second white acrylic coating was applied also at a rate of 2 gal/sq. After an additional 24 hours, this second acrylic coating had completely set and completely dried within 2 weeks, thereby producing the final roofing system of this example.

Example 1

Comparative Example A was repeated except that the stitch-bonded polyester fiber mat used to form the reinforcing layer was first impregnated with 0.5 gal/sq. of a calcium chloride pretreating solution containing the ingredients listed in the following Table 2 and allowed to dry before being used:

TABLE 2

Composition of Calcium Chloride Pre-treating Solution

| Ingredient | Generic Composition | Commercial Name | Weight % |
| --- | --- | --- | --- |
| Tap Water | N/A | N/A | 94 |
| Breaking Agent | Calcium Chloride | Calcium Chloride | 5 |
| Wetting Agent | Silicone Surfactant | BYK-156 | 1 |

Drying and set up of this 3-ply scrim/asphalt system was completed in 24 hours rather than two weeks in the case of Comparative Example A.

As in the case of Comparative Example A, a decorative white acrylic finishing layer was applied to this asphalt roofing system as well. However in this instance, a single white acrylic layer could be applied at a rate of 4 gal/sq. rather than two successive white acrylic layers at a rate of 2 gal/sq. per layer, since the $CaCl_2$ impregnant in the scrim initiated cure of this thicker acrylic layer.

Comparative Example B

An SBR Asphalt Emulsion (Table I) was applied to an asphalt ply sheet at a rate of 3 gal/sq at 25° C. and 50% relative humidity. The SBR Asphalt Emulsion so applied set up and achieved rain-off resistance (35 psi/30 minutes) within 2½ hours of application.

Example 2

Comparative Example B was repeated, except that the asphalt ply sheet was primed with 0.25 gal/sq of the calcium chloride based primer described in Table 3 and allowed to dry before application of the asphalt emulsion.

TABLE 3

| Composition of Calcium Chloride Primer | | | |
|---|---|---|---|
| Ingredient | Generic Composition | Commercial Name | Weight % |
| Tap Water | N/A | N/A | 89 |
| Breaking Agent | Calcium Chloride | Calcium Chloride | 10 |
| Wetting Agent | Silicone Surfactant | BYK-156 | 1 |

The SBR Asphalt Emulsion achieved set up and rain-off resistance (35 psi/30 minutes) in 5 minutes after application, which is much faster than the 2½ hours required in Comparative Example B.

Example 3

A three-ply built-up roofing system was prepared in general accordance with Comparative Example A and Example 1, with only a portion of this roofing system being made with the calcium chloride-impregnated scrim of this invention. The system set up overnight and then a white acrylic coating was applied to the top scrim. Within 15 minutes a thunderstorm passed through with a significant amount of rain. The white acrylic coating completely washed off the roofing system, except where the treated scrim was located.

Although only a few embodiments have been described in this disclosure, many modifications can be made without departing from the spirit and scope of the technology disclosed here. All such modifications are intended to be included within the scope of this technology, which is to be limited only by the following claims.

The invention claimed is:

1. A process for shortening the time needed for an aqueous asphalt emulsion to dry after the emulsion has been applied to a substrate by a single component sprayer, the process being carried out without simultaneous application to the substrate of an emulsion breaker along with the asphalt emulsion, the process comprising
contacting the emulsion with a reinforcing sheet comprising a fibrous or foraminous web or layer of material impregnated with a dried emulsion breaker.

2. The process of claim 1, wherein the aqueous asphalt emulsion is applied to the substrate and thereafter the reinforcing sheet is applied to the aqueous asphalt emulsion.

3. The process of claim 1, wherein the reinforcing sheet is applied to the substrate and thereafter the aqueous asphalt emulsion is applied to the reinforcing sheet.

4. The process of claim 1, wherein the aqueous asphalt emulsion includes an anionic emulsifier and further wherein the emulsion breaker is selected from the group consisting of calcium chloride, calcium nitrate, aluminum chloride and ferric chloride.

5. The process of claim 1, further comprising applying a reflective acrylic emulsion layer to the waterproofing asphalt layer.

6. The process of claim 5, wherein the reflective acrylic emulsion layer is applied to the waterproofing asphalt layer within 24 hours of the application of the waterproofing asphalt layer to the substrate.

7. The process of claim 6, wherein the acrylic emulsion layer is applied in an amount of ≧4 gal./sq.

8. The process of claim 5, wherein the reflective acrylic emulsion layer is applied to a reinforcing sheet comprising a fibrous or foraminous web or layer of material impregnated with the emulsion breaker.

9. A process for shortening the time needed for an apueous asphalt emulsion to dry after the emulsion has been applied to a substrate comprising contacting the emulsion with a reinforcing sheet comprising a fibrous or foraminous web or layer of material impregnated with a dried emulsion breaker.

* * * * *